(12) United States Patent
Morrow et al.

(10) Patent No.: US 7,931,103 B2
(45) Date of Patent: Apr. 26, 2011

(54) ELECTRIC VEHICLE WITH POWER TAKEOFF

(75) Inventors: Jon J. Morrow, Neenah, WI (US);
Martin Schimke, Redgranite, WI (US);
Christopher K. Yakes, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 190 days.

(21) Appl. No.: 12/268,174

(22) Filed: Nov. 10, 2008

(65) Prior Publication Data
US 2009/0127010 A1  May 21, 2009

Related U.S. Application Data

(63) Continuation of application No. 10/952,547, filed on Sep. 28, 2004, now Pat. No. 7,448,460.

(51) Int. Cl.
*B60K 6/36* (2007.10)

(52) U.S. Cl. ........................ 180/65.6; 180/65.265; 475/5

(58) Field of Classification Search .............. 180/65.23, 180/65.25, 65.265, 65.27, 65.275, 65.31, 180/65.6, 65.7; 475/5
See application file for complete search history.

(56) References Cited

U.S. PATENT DOCUMENTS

| | | | |
|---|---|---|---|
| 896,208 A | 8/1908 | Hoffmann | |
| 1,223,495 A | 4/1917 | Kelley | |
| 2,731,099 A | 1/1956 | Schroeder | |
| 3,826,327 A | 7/1974 | Stover | |
| 4,335,429 A | 6/1982 | Kawakatsu | |
| 5,538,274 A | 7/1996 | Schmitz et al. | |
| 5,558,588 A | 9/1996 | Schmidt | |
| 5,562,178 A | 10/1996 | Worden et al. | |
| 5,669,842 A * | 9/1997 | Schmidt | 475/5 |
| 5,755,456 A | 5/1998 | Blažek et al. | |
| 5,808,427 A | 9/1998 | Worden et al. | |
| 5,924,505 A * | 7/1999 | Theurillat et al. | 180/65.23 |
| 5,925,993 A | 7/1999 | Lansberry | |
| 6,026,921 A * | 2/2000 | Aoyama et al. | 180/65.25 |
| 6,062,579 A | 5/2000 | Fortier | |
| 6,105,984 A * | 8/2000 | Schmitz et al. | 280/124.136 |
| 6,148,940 A | 11/2000 | Hokanson et al. | |

(Continued)

FOREIGN PATENT DOCUMENTS

EP   1 229 636 A2   8/2002

(Continued)

OTHER PUBLICATIONS

Jenkins, et al., "Characteristics of SOI FET's Under Pulsed Conditions", *IEEE Transactions on Electron Devices*, vol. 44, No. 11, Nov. 1997 (pp. 1923-1930).

(Continued)

*Primary Examiner* — J. Allen Shriver, II
*Assistant Examiner* — John D. Walters
(74) *Attorney, Agent, or Firm* — Foley & Lardner LLP

(57) ABSTRACT

A vehicle includes an independent suspension for supporting at least first and second wheel ends relative to the vehicle, and a transmission having an input shaft and an auxiliary power output shaft and a respective drive shaft coupled to each wheel end, and an electrical power source, and a variable speed electric motor electrically coupled to the electrical power source and mechanically coupled to the input shaft, where the transmission is configured to apply power from the electric motor to the auxiliary power output shaft dependently or independently of the application of power from the electric motor to the drive shafts.

17 Claims, 3 Drawing Sheets

U.S. PATENT DOCUMENTS

| | | | |
|---|---|---|---|
| 6,398,685 | B1 | 6/2002 | Wachauer et al. |
| 6,431,298 | B1 | 8/2002 | Ruppert, Jr. et al. |
| 6,491,123 | B1 | 12/2002 | Pasquini et al. |
| 6,516,907 | B2 | 2/2003 | Robinson |
| 6,516,914 | B1 | 2/2003 | Andersen et al. |
| 6,533,696 | B1 | 3/2003 | Takenaka et al. |
| 6,561,718 | B1 | 5/2003 | Archer et al. |
| 6,651,762 | B1 | 11/2003 | Hokanson et al. |
| 6,692,395 | B2 | 2/2004 | Rodeghiero et al. |
| 6,708,788 | B2 | 3/2004 | Kuwayama |
| 6,757,597 | B2 | 6/2004 | Yakes et al. |
| 6,843,750 | B1 | 1/2005 | Bennett |
| 6,899,190 | B2 | 5/2005 | Bordini |
| 6,904,987 | B2 | 6/2005 | Haas et al. |
| 6,935,451 | B2 | 8/2005 | Bell et al. |
| 6,935,990 | B2 | 8/2005 | Kim |
| 6,978,853 | B2 | 12/2005 | Bennett |
| 7,028,583 | B2 | 4/2006 | Bennett |
| 7,104,920 | B2 | 9/2006 | Beaty et al. |
| 7,115,057 | B2 | 10/2006 | House |
| 7,134,517 | B1 | 11/2006 | Kaiser et al. |
| 7,213,665 | B2 * | 5/2007 | Yamaguchi et al. ....... 180/65.27 |
| 2002/0092687 | A1 | 7/2002 | Forster |
| 2002/0103580 | A1 | 8/2002 | Yakes et al. |
| 2003/0159865 | A1 | 8/2003 | Schmidt |
| 2003/0205422 | A1 | 11/2003 | Morrow et al. |
| 2004/0163893 | A1 | 8/2004 | Langen |

FOREIGN PATENT DOCUMENTS

| | | |
|---|---|---|
| EP | 1 340 643 A2 | 9/2003 |
| FR | 2 851 621 A1 | 8/2004 |

OTHER PUBLICATIONS

PCT International Search Report based on International Application No. PCT/US2005/035008, date of mailing of the International Search Report, Feb. 1, 2006 (2 pgs.).

European Office Action for Application No. 05 805 704.3, dated Apr. 25, 2008, 24 pages.

European Office Action for Application No. 05 805 704.3, dated Oct. 2, 2007, 3 pages.

First Office Action for Chinese Application No. 2005800398319, dated Nov. 20, 2008, 6 pages.

Second Office Action for Chinese Application No. 2005800398319, dated Jun. 22, 2009, 12 pages.

* cited by examiner

ELECTRIC VEHICLE WITH POWER TAKEOFF

CROSS REFERENCE TO RELATED APPLICATIONS

This application claims the benefit of priority under 35 U.S.C. 120 of U.S. patent application Ser. No. 10/952,547, having a filing date of Sep. 28, 2004, titled "Power Takeoff For An Electric Vehicle," the complete disclosure of which is hereby incorporated by reference.

FIELD

The present invention relates generally to electric vehicles, and more particularly to a power take-off coupled to an axle module for an electric vehicle.

BACKGROUND

In a conventional electric vehicle, a prime mover such as a diesel engine, is used to drive an electric generator or alternator which supplies electric current to a plurality of electric motors. The electric motors typically are coupled to wheel sets, in line, on the vehicle. The vehicles that utilize this type of hybrid electric motors are typically railroad locomotives.

The prime mover drives the generator/alternator that typically produces an AC current that is then fully rectified with resulting DC current and voltage being distributed to current converters coupled to the traction motors. Such systems are highly integrated with each of the components typically designed and manufactured to operate with the other components in the overall system. In other words, "off the shelf" components are not readily adaptable for use in the initial design or ongoing maintenance of such vehicles. Further, such vehicles have multiple components associated with the change of AC to DC to AC power. Maintenance of such systems is expensive since specific components must be used.

In the use of hybrid drives for such vehicles, it is often necessary to add support systems that require a source of power to operate. Typically, these systems are centrally mounted on the vehicle and require the routing of specialized, pressurized, conduits to specific points around the vehicle. Conventional sources of auxiliary power are typically an internal combustion engine operated generator or a motor generator set. Such additional components and equipment add cost to the vehicle and take up space on the vehicle.

Thus there is a need for a power take-off for a vehicle that does not require an additional engine. There is a further need for a method to provide power to an auxiliary apparatus mounted on a vehicle utilizing the traction motor of the vehicle.

SUMMARY

According to one embodiment, a vehicle includes an independent suspension for supporting at least first and second wheel ends relative to the vehicle, and a transmission having an input shaft and an auxiliary power output shaft and a respective drive shaft coupled to each wheel end, and an electrical power source, and a variable speed electric motor electrically coupled to the electrical power source and mechanically coupled to the input shaft, where the transmission is configured to apply power from the electric motor to the auxiliary power output shaft dependently or independently of the application of power from the electric motor to the drive shafts.

According to another embodiment, a vehicle with a power takeoff includes an internal combustion engine and at least one electric drive axle module. The axle module includes a housing, and a main output shaft defining a first end and a second end, and a first wheel end assembly coupled to the first end and independently suspended relative to the vehicle, and a second wheel end assembly coupled to the second end and independently suspended relative to the vehicle, and a variable speed electric motor, and a transmission disposed within the housing and including a neutral state, the transmission coupled to the electric motor and engageable with the main output shaft to drive the wheel end assemblies, and an auxiliary output shaft coupled to the transmission, wherein when the transmission is in the neutral state, the auxiliary output shaft will operate at a speed independent of a speed of the wheel end assemblies and dependant on the electric motor speed and when the transmission is operably engaged in other than the neutral state, the auxiliary output shaft will operate at a speed related to both electric motor speed and the speed of the wheel end assemblies.

According to a further embodiment, a vehicle with a power takeoff includes an electric power source and at least one electric drive axle module. The axle module includes a housing, and an output shaft, and a first and second wheel end assemblies coupled to the output shaft and independently suspended relative to the vehicle, and a variable speed electric motor, and a transmission having a neutral state, the transmission coupled to the electric motor and engageable with the output shaft to drive the wheel end assemblies, and an auxiliary output shaft coupled to the transmission and operable at a first speed independent of the wheel end assemblies and dependant on the electric motor speed when the transmission is in the neutral state, and operable at a second speed related to electric motor speed and wheel end assembly speed when the transmission is engaged in another state.

DETAILED DESCRIPTION

Figure 1:
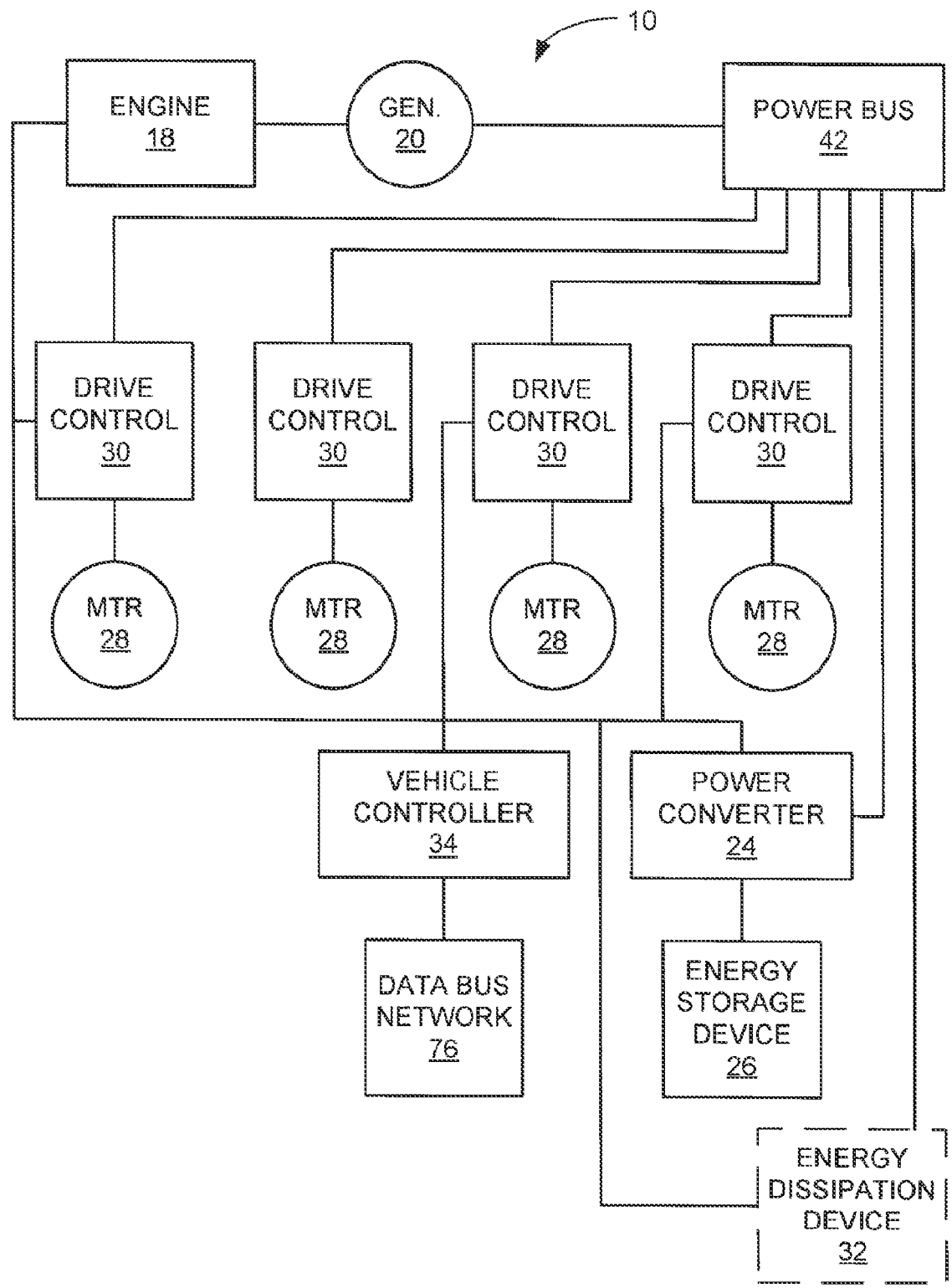
FIG. 1 is a schematic diagram of an electric vehicle according to an exemplary embodiment.
Figure 2:
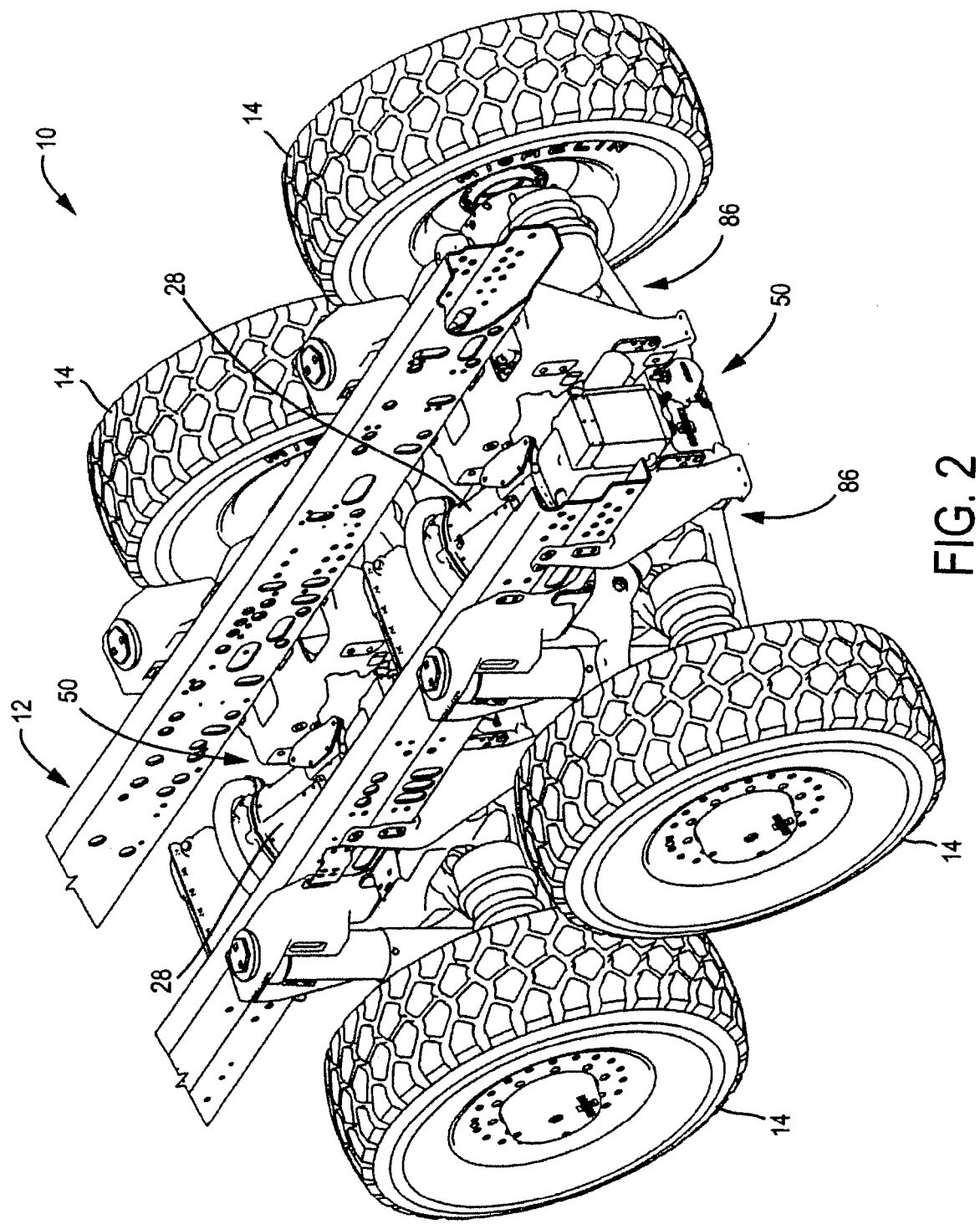
FIG. 2 is a partial perspective view of an exemplary embodiment of a vehicle including a self-contained axle module coupled to a vehicle support structure of the vehicle.

FIG. 1 is a schematic diagram of an electric vehicle 10 according to an exemplary embodiment. An electric vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The electric vehicle 10 can be used to implement electric vehicles in general and/or hybrid electric vehicles in particular. The electric vehicle 10 can implement a number of different vehicle types, such as a fire-fighting vehicle, military vehicle, snow blower vehicle, refuse handling vehicle, concrete mixing vehicle, etc.

In the illustrated embodiment, the electric vehicle 10 includes an engine 18, a generator 20, an electric power converter 24, an energy storage device 26, a plurality of electric motors 28, a plurality of drive controllers 30, a vehicle controller 34. Electric vehicle 10 optionally includes an energy dissipation unit 32. The generator 20, the drive controllers 30, and the electric power converter 24 are interconnected by a power bus 42, such as an AC or DC power bus. Electric vehicle 10 is generally configured to use a combination of the engine 18 and the generator 20 to provide braking capability and to dissipate excess electrical power generated by the electric motors 28 during regenerative braking.

The engine 18 is preferably an internal combustion engine, such as a diesel engine configured to both provide mechanical power to the generator 20 and to receive mechanical power from generator such that may function as a mechanical engine brake or air compressor. The generator 20 is coupled to the engine 18 and may be configured to function as both generator configured to provide AC or DC power, and as a motor configured to receive electrical power and provide mechanical power to the engine 18.

The electric power converter 24 is coupled to the energy storage device 26 and is configured to convert the electrical power generated by the generator 20, or by the electric motors 28 during regenerative braking, to the energy mode required by the energy storage device 26. For example, according to an exemplary embodiment, the electric power converter is configured to convert AC power generated by the generator 20 to DC power and transfer such converted power to the storage device 26. The electric power converter 24 may also convert the energy stored in the energy storage device 26 back to the energy mode of generator 20 to augment and supplement the power generated by generator 20 over the power bus 42. The energy storage device 26 may be electric capacitors, electrochemical capacitors or "ultracapacitors," storage batteries, a flywheel, or hydraulic accumulators.

The electric motors 28 are appropriately sized electric motors, which may be AC or DC electric motors. The electric motors 28 are configured to receive electrical power from the power bus 42 in order to provide a mechanical energy output to a wheel or axle. The electric motors 28 are also configured to receive mechanical energy from the wheel or axle during regenerative braking in order to generate electrical power onto the power bus 42.

The drive controllers 30 are coupled to each electric motor 28 and are configured to control the operation of each electric motor 28. More specifically, the drive controllers are configured to allow the electric motors 28 to either receive electrical power from the power bus 42 in order to provide a mechanical energy output to a wheel or axle, or to receive mechanical energy from the wheel or axle during regenerative braking in order to generate electrical power onto the power bus 42.

The vehicle controller 34 is coupled to the engine 18, the generator 20, the electric power converter 24, and the drive controllers 30 via a data bus network 76. The vehicle controller 34 is generally configured to control the operation of the engine 18, the generator 20, the electric power converter 24, the energy storage device 26, the plurality of electric motors 28, and the plurality of drive controllers 30. More specifically, the vehicle controller 34 is configured to assist in controlling the distribution of electrical power on the power bus so that the flow of electrical power from generator 20 and engine 18 may be reversed to provide braking capability, and so that excess electrical power generated by the electric motors 28 during regenerative braking is routed back to the generator 20 so that it may be dissipated through engine 18.

The optional energy dissipation unit 32 is typically a resistive element through which electrical power generated by the electric motors 28 during regenerative braking is dissipated as heat if the electrical power exceeds the capacity of the energy storage device 26. Preferably, electric vehicle 10 is configured such that the excess electrical power generated by the electric motors 28 during regenerative braking is sufficiently dissipated through engine 18 and generator 20.

In conventional vehicles and particularly in vehicles having a hybrid electric drive, it is often necessary to add support systems such as pressurized lubrication and supplemental cooling systems. Such systems typically are centrally mounted on the vehicle and require the routing of pressurized oil lines throughout the vehicle. The elimination of or limiting the number of such specialized conduit lines being routed through the vehicle, results in additional space for other components and truck parts. A self-contained axle module 50 for the vehicle 10, which typically includes a lubrication pump, the oil filter, and heat exchanger at the axle and integrating such components into a self-contained axle module minimizes the conduit routings mentioned above.

A self-contained axle module 50 can be mounted or coupled to the vehicle 10 support structure 12 at any convenient position determined by the manufacturer or user of the vehicle 10. Also, because of the modular configuration, a self-contained axle module 50 can be easily removed and replaced for maintenance or repairs. The self-contained axle module 50 only has to be coupled to the source for electrical power such as the principal power unit and generator 18, 20 and the electric AC power bus 42. It should be understood that other sources of power, as described above, can be coupled to the self-contained axle module 50 to provide the necessary electrical power to operate the electric motor 28, as described below. In addition to coupling electric power to the self-contained axle module 50, a control signal, through a data bus 76 network provides the necessary control and feedback signals for operation of the axle. It is also contemplated that supplemental cooling may be required because of the environment or operating conditions of the self-contained axle module 50 and therefore supplemental cooling source can also be coupled to the axle.

The housing 56 can be composed of any suitable material, such as iron, steel, or aluminum and can be cast and machined as designed by the manufacturer. The housing 56 includes a sump portion in the lowest area of the housing 56. The housing 56 in addition to the components described below also houses a transmission 58 which transmits force from the electric motor 28 to the output shaft 60 and to a power take-off 88. The transmission 58 may include several types of gears such as planetary gears, sprocket gears, bevel gears or the like with selected gear ratios as determined by the manufacturer and operator of the vehicle 10.

Figure 3:
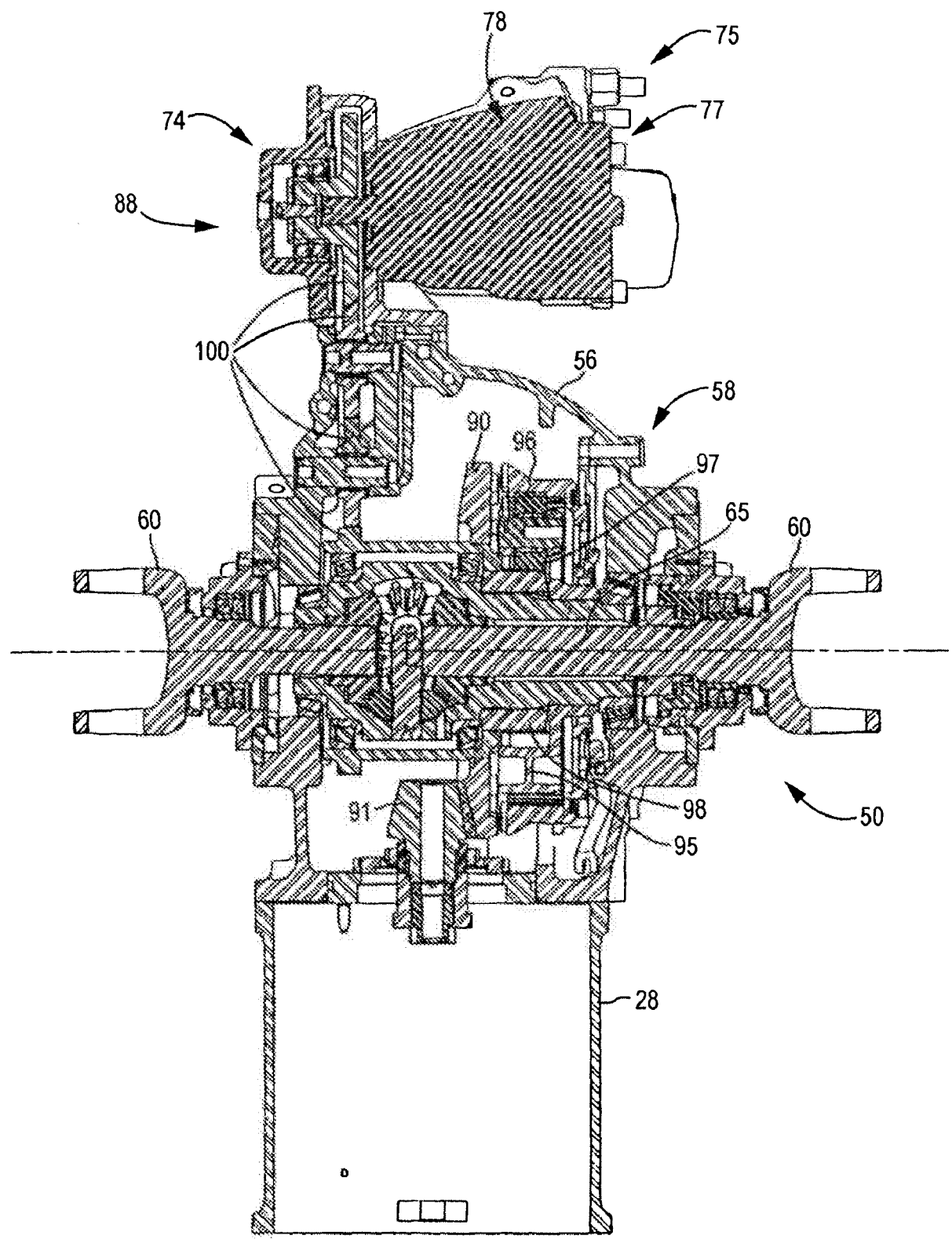
FIG. 3 is a cross section of a power take off coupled to a transmission mounted in a housing of an axle module and coupled to an electric motor of a hybrid vehicle.

The power take-off 88 includes a power take-off (PTO) housing 74 mounted on the housing 56 and coupled to the transmission 58 and an auxiliary apparatus 75, such as a tool 77 (See FIG. 3.). The transmission 58 includes a primary drive gear 90 which is coupled to the motor drive gear 91. The motor drive gear 91 transmits rotational power from the electric motor 28. The primary drive gear 90 is coupled to the PTO gear train 100 and to the bevel gear differential assembly 65. The transmission 58 is in a neutral state when a secondary reduction planetary annulus 96 is moved to a neutral position such that it is not coupled to the primary drive gear 90. When the secondary reduction planetary annulus 96 is in the neutral position, the tool 77 will operate at a speed other than the speed of the vehicle. In other words, it will operate at the speed proportional to the speed of the electric motor 28. When the secondary reduction planetary annulus 96 is moved to a position other than the neutral position, for example, when it is coupled to the primary drive gear 90, the subsystem apparatus 75 will operate at a speed related to both the electric motor 28 speed and the wheel speed since it is coupled to the output shaft 60 of the axle module 50 of the vehicle 10. The secondary reduction planetary annular 96 can be moved by an actuator, for example, a fluid cylinder (pneumatic or hydraulic) or an electric apparatus, such as a solenoid.

The transmission 58 also includes a secondary reduction planetary carrier 95, a secondary reduction planetary planet gear 97 and a secondary reduction planetary sun gear 98. It should be understood that other types of gearing configurations are contemplated for the transmission 58. It should also be understood that the housing 56 and the power take-off housing 74 can be integrally formed to house both the power take-off gear train 100 and the transmission 58.

The tool 77 can be any type of tool that requires mechanical power transmission, for example, a hydraulic pump 78 or a drive shaft, a pulley for a belt drive or similar apparatus can be coupled to the power take-off 88.

It should also be understood that the transmission 58 can be geared for at least two speeds, however, any other number of gear ratios can be utilized to obtain any number of appropriate and convenient speeds for purposes of powering the power takeoff 88 (also referred to as a subsystem power source).

A method for providing power to a subsystem apparatus, such as a tool 77 is accomplished by mounting a power take-off 88 on a vehicle utilizing an electric motor 28 of the vehicle 10. The electric motor 28 is coupled to an axle module 50 to transmit power to a vehicle wheel 14. The method includes the steps of providing a power take-off (PTO) apparatus 88 having a PTO gear train 100. Coupling the PTO gear train 100 to the traction motor 28. Providing a planetary annulus gear 96 and coupling the planetary annulus gear 96 to the axle 50 with the planetary annulus gear 96 configured to move between a first position and a second position wherein in the first position, the PTO 88 will move at a speed related to the speed of the vehicle 10 and in the second position, the PTO 88 will move at a speed different from the speed of the vehicle 10. The PTO 88 is always driven as a function of the electric motor 28 speed with the proviso that the PTO 88 speed may be related to the vehicle speed.

Control of the secondary reduction planetary annulus 96 is maintained by a fluid cylinder such as an air cylinder. It is also contemplated that a hydraulic cylinder or an electric apparatus, such as a solenoid can be utilized to move the secondary reduction planetary annulus 96 from a first position to a second position.

The PTO 88 can be used to drive the tool 77, such as a pump 78, and to power other equipment associated with the vehicle 10. The PTO can be configured to operate at a speed related to the vehicle speed or to function at a speed other than the speed of the vehicle. The electric motor 28 provides power to the PTO through an associated PTO gear train 100 and can be coupled or uncoupled to the output shaft 60 of the self-contained axle module 50.

The tool 77 such as a pump 78 can be utilized as a high volume water pump mounted on one of the axle modules 50 of the fire truck or airport crash truck. As an example, one of the axle modules 50 can be configured to move the vehicle 10 while another axle module 50 is configured to power the tool 77, such as the water pump with the PTO 88.

According to another alternative embodiment, the tool 77 powered by the power take-off apparatus 88 can be a power generator where the rotational mechanical energy of the electric motor 28 is converted into electrical energy to power additional auxiliary systems. Such arrangement can be configured as described above, where one axle module 50 is configured to move the vehicle 10 and another axle module 50 is configured to power the power generator either when the vehicle 10 is moving or while the vehicle 10 is stopped.

Several alternative embodiments have been described with reference to the power take-off apparatus 88, however, the invention is not limited to the described embodiments. Any power take-off system that utilizes the rotational mechanical energy supplied by the electric motor 28 is within the scope and spirit of the invention.

It is also contemplated that the vehicle 10 may also include a plurality of independent suspension assemblies 86 which independently suspends one of the wheel end assemblies relative to the vehicle support structure 12'.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of embodiments has been presented for purposes of illustration and description. It is not intended to be exhaustive or to be limited to the precise forms disclosed, and modifications and variations are possible in light of the above teachings. The embodiments were chosen and described in order to explain the principles of the subsystem power source and its practical application to enable one skilled in the art to utilize the various embodiments and with various modifications as are suited to the particular use contemplated. It is intended that the scope of the subsystem power source be defined by the claims appended hereto and their equivalents.

What is claimed is:

1. An electric vehicle comprising:
   an independent suspension for supporting at least first and second wheel ends relative to the vehicle;
   a transmission having an input shaft, an auxiliary power output shaft and a respective drive shaft coupled to each wheel end;
   an electrical power source; and
   a variable speed electric motor electrically coupled to the electrical power source, and mechanically coupled to the input shaft, wherein when the transmission is in a neutral state, the auxiliary output shaft will operate at a speed independent of a speed of the wheel ends and dependant on the electric motor speed and when the transmission is operably engaged in other than the neutral state, the auxiliary output shaft will operate at a speed related to both electric motor speed and the speed of the wheel ends.

2. The vehicle of claim 1 wherein the electrical power source comprises an electric generator coupled to an internal combustion engine.

3. The vehicle of claim 2 further comprising a power converter configured to convert AC electric power from the electric generator to DC electric power.

4. A vehicle with a power takeoff, comprising:
an internal combustion engine;
at least one electric drive axle module comprising:
a housing;
a main output shaft defining a first end and a second end;
a first wheel end assembly coupled to the first end and independently suspended relative to the vehicle;
a second wheel end assembly coupled to the second end and independently suspended relative to the vehicle;
a variable speed electric motor;
a transmission disposed within the housing and including a neutral state, the transmission coupled to the electric motor and engageable with the main output shaft to drive the wheel end assemblies; and
an auxiliary output shaft coupled to the transmission, wherein when the transmission is in the neutral state, the auxiliary output shaft will operate at a speed independent of a speed of the wheel end assemblies and dependant on the electric motor speed and when the transmission is operably engaged in other than the neutral state, the auxiliary output shaft will operate at a speed related to both electric motor speed and the speed of the wheel end assemblies.

5. The electric vehicle of claim 4 wherein the internal combustion engine comprises a diesel engine.

6. The electric vehicle of claim 4 further comprising a generator rotatably engaged with the internal combustion engine and configured to provide a source of AC electric power.

7. The electric vehicle of claim 6 further comprising a power converter configured to convert the AC electric power from the generator to a source of DC electric power.

8. The electric vehicle of claim 6 wherein the variable speed electric motor receives AC electric power from the generator.

9. The electric vehicle of claim 7 wherein the variable speed electric motor receives DC electric power from the power converter.

10. A vehicle with a power takeoff, comprising:
an electric power source;
at least one electric drive axle module comprising:
a housing;
an output shaft;
a first and second wheel end assemblies coupled to the output shaft and independently suspended relative to the vehicle;
a variable speed electric motor;
a transmission having a neutral state, the transmission coupled to the electric motor and engageable with the output shaft to drive the wheel end assemblies; and
an auxiliary output shaft coupled to the transmission and operable at a first speed independent of the wheel end assemblies and dependant on the electric motor speed when the transmission is in the neutral state, and operable at a second speed related to electric motor speed and wheel end assembly speed when the transmission is engaged in another state.

11. The electric vehicle of claim 10 wherein the electric power source comprises a chemical conversion device.

12. The electric vehicle of claim 10 wherein the electric power source comprises a battery.

13. The electric vehicle of claim 10 wherein the electric power source comprises a stored electrical charge device.

14. The electric vehicle of claim 10 wherein the electric power source comprises a mechanical energy device.

15. The electric vehicle of claim 10 further comprising a power converter configured to convert AC electric power from the electric power source to DC electric power.

16. The electric vehicle of claim 10 wherein the electric drive axle module comprises a self-contained axle module removably attachable to the vehicle support structure.

17. The electric vehicle of claim 10 wherein the transmission is geared for at least two speeds.

* * * * *